(12) United States Patent
Girier et al.

(10) Patent No.: US 10,969,519 B2
(45) Date of Patent: Apr. 6, 2021

(54) WEATHER PREDICTION APPARATUS AND METHOD USING WEATHER RADAR

(71) Applicant: KABUSHIKI KAISHA TOSHIBA, Minato-ku (JP)

(72) Inventors: Armand Simon Alymamy Girier, Tokyo (JP); Yeonsoo Yang, Machida (JP); Takahiro Watanabe, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 697 days.

(21) Appl. No.: 15/636,700

(22) Filed: Jun. 29, 2017

(65) Prior Publication Data

US 2018/0074223 A1    Mar. 15, 2018

(30) Foreign Application Priority Data

Sep. 15, 2016 (JP) .............................. JP2016-180880

(51) Int. Cl.
*G01W 1/10* (2006.01)
*G06Q 10/04* (2012.01)
(Continued)

(52) U.S. Cl.
CPC .............. *G01W 1/10* (2013.01); *G01S 13/95* (2013.01); *G01W 1/00* (2013.01); *G06Q 10/04* (2013.01); *G01W 2203/00* (2013.01)

(58) Field of Classification Search
CPC ..... G01W 1/10; G01W 1/00; G01W 2203/00; G01S 13/95; G06Q 10/04
(Continued)

(56) References Cited

U.S. PATENT DOCUMENTS

2011/0234453 A1   9/2011  Mizutani et al.
2017/0192128 A1   7/2017  Furumoto
2017/0371074 A1*  12/2017 Elkabetz ................. G01W 1/10

FOREIGN PATENT DOCUMENTS

JP    2000-75029 A    3/2000
JP    2001-33567      2/2001
(Continued)

OTHER PUBLICATIONS

Otsuka et al., Precipitation Nowcasting with Three-Dimensional Space—Time Extrapolation of Dense and Frequent Phased-Array Weather Radar Observations, Feb. 2016 American Meteorological Society, Weather and Forecasting, vol. 31, pp. 329-340 (Year: 2016).*

(Continued)

*Primary Examiner* — Toan M Le
*Assistant Examiner* — Xiuqin Sun
(74) *Attorney, Agent, or Firm* — Oblon, McClelland, Maier & Neustadt, L.L.P.

(57) ABSTRACT

According to one embodiment, a weather prediction apparatus includes a storage configured to store weather data of a rain cloud observed by a weather radar; and a processor configured to predict a torrential rain. The processor is configured to detect a core of the rain cloud, based on the weather data; to acquire position information of the core, based on a detection result of the core; to determine a movement direction of the core, based on the position information; and to calculate information for predicting, as an area of occurrence of the torrential rain, an area on a ground, the area on the ground corresponding to the movement direction of the core.

12 Claims, 8 Drawing Sheets

(51) Int. Cl.
*G01S 13/95* (2006.01)
*G01W 1/00* (2006.01)

(58) Field of Classification Search
USPC .............................................. 702/3
See application file for complete search history.

(56) References Cited

FOREIGN PATENT DOCUMENTS

| JP | 2001-324576 | 11/2001 |
|----|-------------|---------|
| JP | 2010-60444 | 3/2010 |
| JP | 2010-164557 | 7/2010 |
| JP | 2011-203109 | 10/2011 |
| JP | 2013-130419 | 7/2013 |
| WO | WO 2012/036368 A1 | 3/2012 |
| WO | WO 2015/182142 A1 | 12/2015 |

OTHER PUBLICATIONS

Isoda, F., et al., "Three-dimensional Observations of Heavy Rainfall Using a Phased-Array Weather Radar", Visualization Information Feature Articles, vol. 34 No. 135, Oct. 2014, pp. 148-153, (with unedited computer generated English translation).

'Launched "DioVISTA/Storm" Software that Displays Rain Clouds Overlaid on a Map and Displays them Three-Dimensionally: Support Monitoring of Tornado and Guerilla Heavy Rain', Hitachi Power Solutions Corporation, Aug. 5, 2014, pp. 1-7 (with unedited computer generated English translation).

* cited by examiner

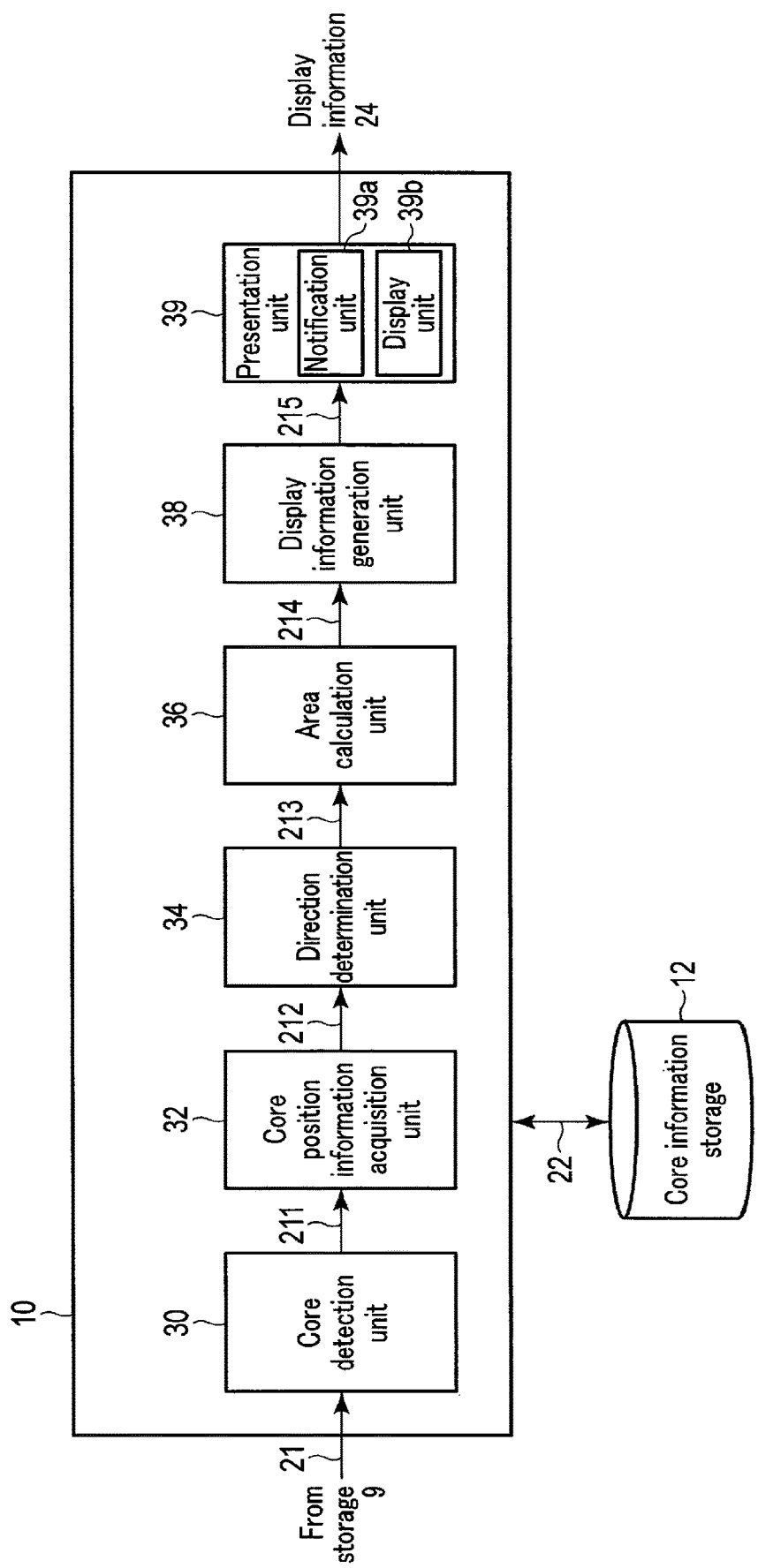
F I G. 3

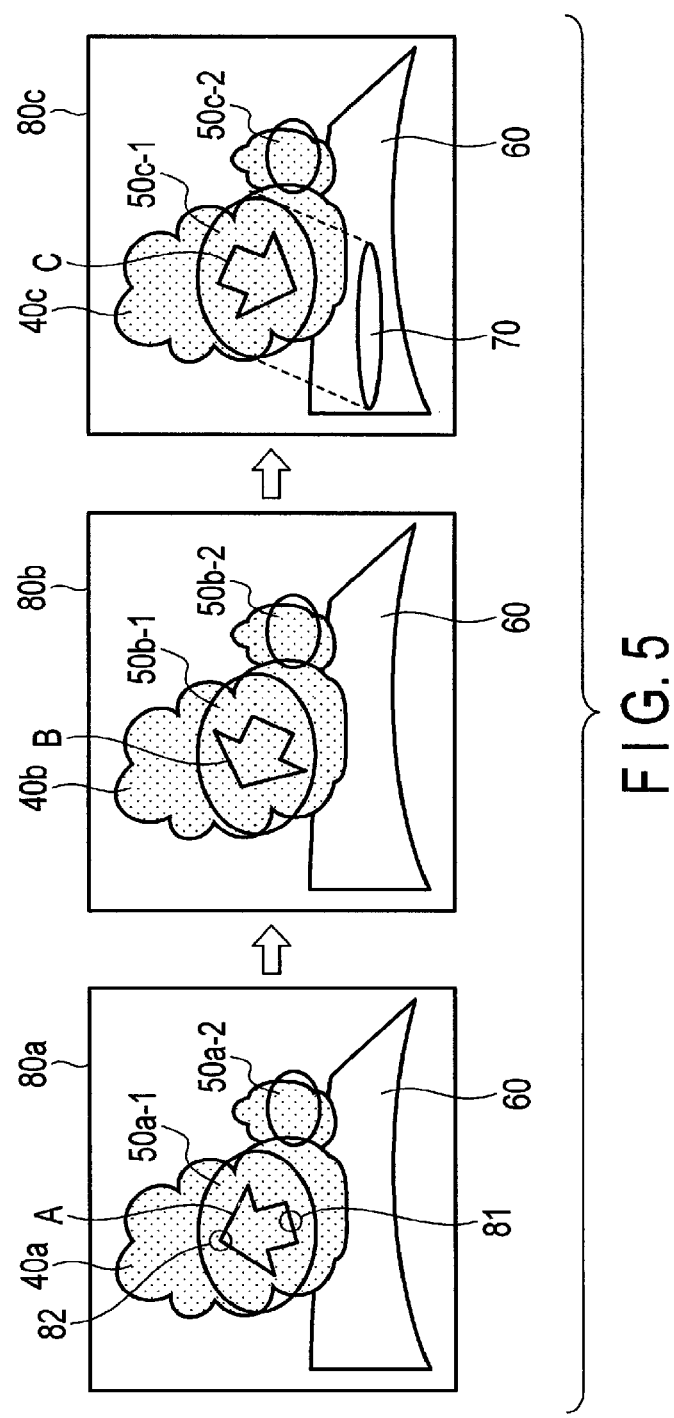
F I G. 5

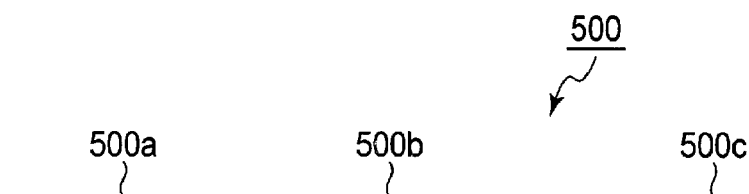
F I G. 7

WEATHER PREDICTION APPARATUS AND METHOD USING WEATHER RADAR

CROSS-REFERENCE TO RELATED APPLICATIONS

This application is based upon and claims the benefit of priority from the Japanese Patent Application No. 2016-180880, filed Sep. 15, 2016, the entire contents of which are incorporated herein by reference.

FIELD

Embodiments described herein relate generally to a weather prediction apparatus and method using a weather radar.

BACKGROUND

In recent years, there has been developed a phased array weather radar (PAWR) which can three-dimensionally scan in a short time a rain cloud such as a cumulonimbus, which causes an abnormal weather phenomenon such as an unexpected localized torrential rain.

Data relating to a rain cloud observed by the PAWR (hereinafter referred to as "weather data") is utilized in a system which supports a user in making various judgments by viewing the state of the rain cloud in real time. The user is, for instance, a user who is mainly engaged in disaster prevention, such as a manager of a pump facility of a river or the like, or a supervisor of a fire station.

However, since such users are not experts relating to weather phenomena, there is a problem that they cannot easily interpret weather data. Thus, there is a demand for enabling even a user, who is not an expert, to easily interpret weather data that is obtained by using the PAWR, and to easily utilize the weather data in order to predict, for example, an unexpected localized torrential rain.

BRIEF DESCRIPTION OF THE DRAWINGS

FIG. 3 is a block diagram for describing a torrential rain prediction function which is realized by the server of the embodiment;

FIG. 5 is a view for describing an example of a direction of movement of a core in the torrential rain prediction process of the embodiment;

FIG. 7 is a view illustrating an example of core information in the torrential rain prediction process of the embodiment.

DETAILED DESCRIPTION

In general, according to one embodiment, a weather prediction apparatus includes a storage configured to store weather data of a rain cloud observed by a weather radar; and a processor configured to predict a torrential rain. The processor is configured to detect a core of the rain cloud, based on the weather data; to acquire position information of the core, based on a detection result of the core; to determine a movement direction of the core, based on the position information; and to calculate information for predicting, as an area of occurrence of the torrential rain, an area on a ground, the area on the ground corresponding to the movement direction of the core.

Various embodiments will be described hereinafter with reference to the accompanying drawings.

[Configuration of System]

Figure 1:
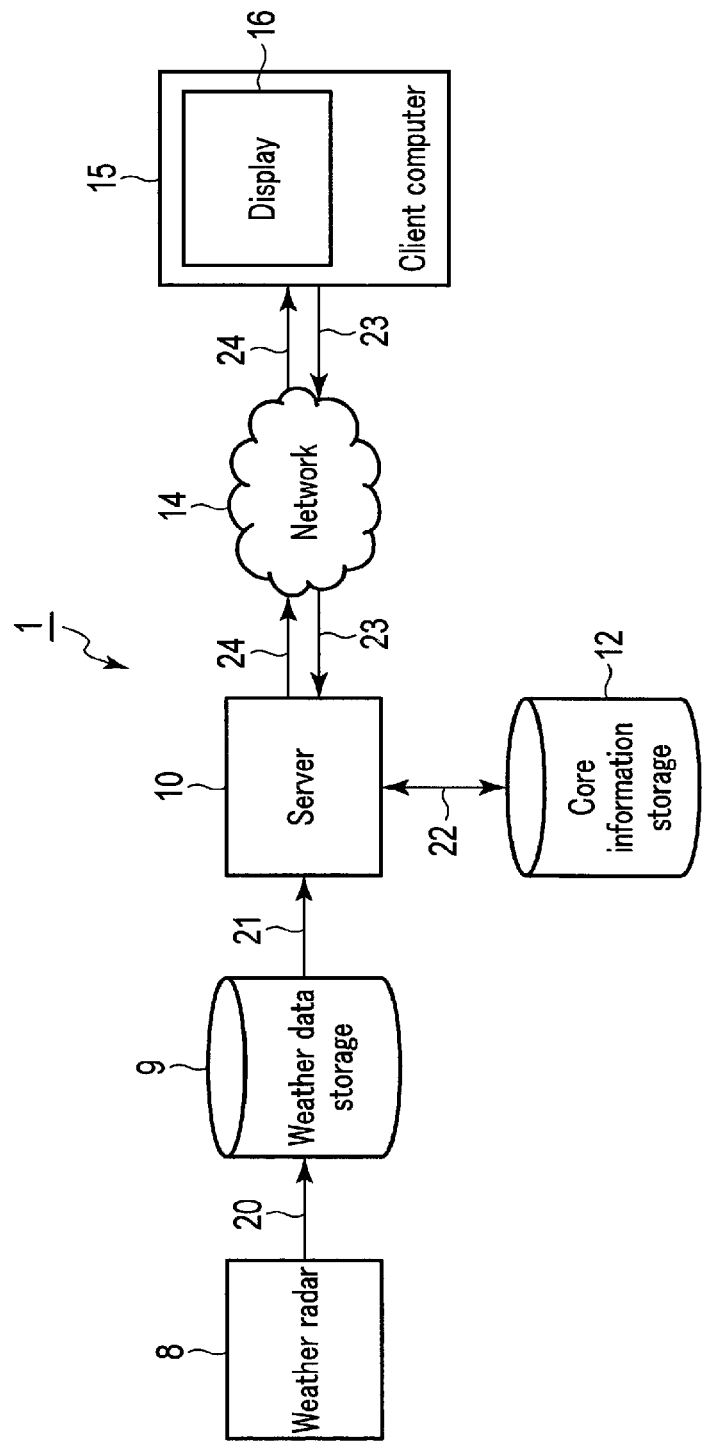
FIG. 1 is a block diagram illustrating a configuration example of a weather prediction system according to an embodiment.

FIG. 1 is a block diagram illustrating a configuration example of a weather prediction system 1 of an embodiment. As illustrated in FIG. 1, the weather prediction system 1 includes a weather radar 8, a weather data storage 9, a server 10, a core information storage 12, and a client computer 15.

The weather prediction system 1 of the embodiment is a system which can visualize, by a Web application or the like, weather data 20 which is acquired by the weather radar 8, and can present a state of a weather phenomenon (hereinafter referred to as "abnormal whether phenomenon") of a rain cloud which causes a torrential rain, such as a cumulonimbus, to a user in real time. Specifically, the present system 1 is applicable as a system for supporting, for example, the user's judgment (prediction) relating to a torrential rain. Here, the abnormal weather phenomenon is, for example, a phenomenon in which the state of a rain cloud changes temporally sharply.

The weather radar 8 is a weather radar, such as a PAWR of single polarization or double polarization, which scans, at high speed in a short time, the entirety of a rain cloud which causes an abnormal weather phenomenon. The weather radar 8 can execute scan at a cycle of, e.g. 30 seconds, which is shorter than, for example, 30 minutes that is a development time of a general rain cloud, and can observe the abnormal weather phenomenon three-dimensionally. The weather radar 8 acquires three-dimensional (3D) data or the like of the abnormal weather phenomenon as the weather data 20, and stores the weather data 20 in the weather data storage 9.

The weather data storage 9 stores, for a predetermined period, the weather data 20 observed by the weather radar 8. The weather data storage 9 may store, as well as the weather data 20, for example, map information which is associated with the weather data 20 and includes the position of a rain cloud that is an observation target.

The server 10 is composed of a computer and software, which realize, for example, a function of predicting a torrential rain, as weather prediction, as will be described later. The server 10 is connected to the weather data storage 9 and core information storage 12. The server 10 can acquire weather data (including map information or the like) 21 from the weather data storage 9, and can acquire core information 22 from the core information storage 12.

Based on the weather data 21 and core information 22, the server 10 executes a process (core detection process) of detecting a core of a rain cloud, a process (torrential rain prediction process) of predicting a torrential rain, and a three-dimensional (3D) display process (simply referred to as "display process") of a rain cloud. Specifically, the present embodiment is configured to execute a torrential rain prediction process, with attention paid to a core of a rain cloud.

The server 10 is, for example, a cloud-type image processing server which is connected to the client computer 15 via the network 14 such as the Internet. In response to a request 23 from the client computer 15, the server 10 transmits display information 24 as a result of the torrential rain prediction process to the client computer 15. The server 10 may streaming-deliver video or the like including the display information 24, as a result of the torrential rain prediction process, to the client computer 15. Incidentally, the display information 24 includes, together with image information, position information or the like which relates to an area where a torrential rain is predicted.

As will be described later, based on the display information 24, the client computer 15 can display, on a display 16, a torrential rain prediction area, a three-dimensional (3D) image and two-dimensional (2D) image of a rain cloud, or an image of a core. The client computer 15 is, for example, a personal computer, a smartphone, or the like, in which an application for displaying a result of the torrential rain prediction process is assembled. The client computer 15 may execute, for example, a display process of displaying on the display 16 an area where a torrential rain is predicted, as a process of displaying a result of the torrential rain prediction process. In the meantime, the request 23 from the client computer 15 may include, for example, a request for information relating to a position of a rain cloud, or a time associated with the position of the rain cloud.

Here, the server 10 stores the core information 22, which is calculated by the core detection process, in the core information storage 12. The core detection process is, for example, a process of detecting a core by using the 3D data of the weather data 20 (21). The core information 22 includes, for example, information relating to the position or size of the core (see FIG. 7).

Figure 2:
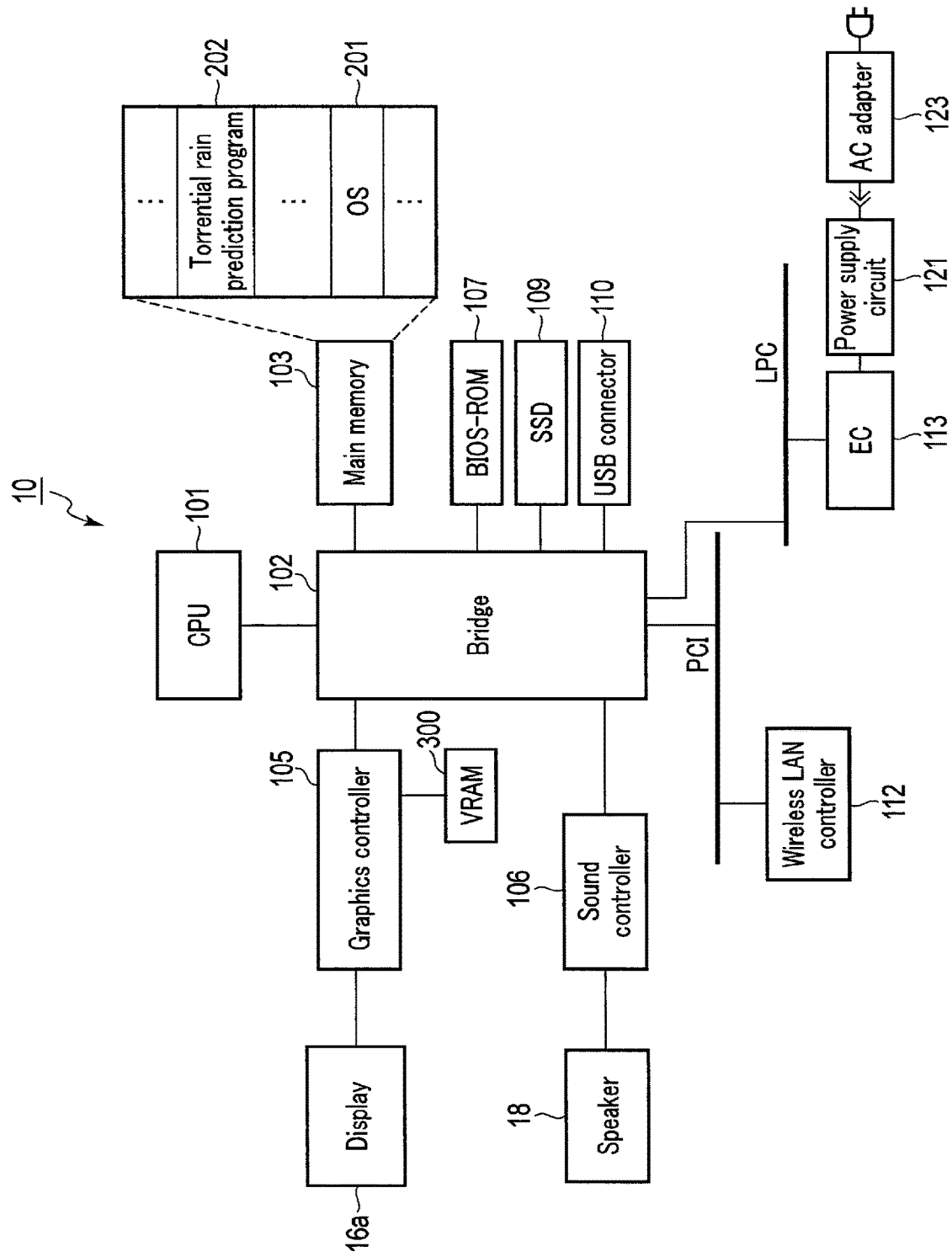
FIG. 2 is a block diagram illustrating a configuration example of a server which is used in the system of the embodiment.

FIG. 2 is a view illustrating a configuration example of the server 10 of the embodiment. As illustrated in FIG. 2, the server 10 includes, for example, a display 16a, a speaker 18, a processor (central processing unit: CPU) 101, a bridge 102, a main memory 103, a graphics controller (GPU) 105, a sound controller 106, a BIOS-ROM 107, a solid-state drive (SSD) 109, a USB connector 110, a wireless LAN controller 112, an embedded controller (EC) 113, a power supply circuit 121, an AC adapter 123, and a video memory (VRAM) 300.

The processor 101 realizes a torrential rain prediction function of the present embodiment, and controls internal operations. The processor 101 executes an operating system (OS) 201 and various application programs, which are loaded in the main memory 103 from the SSD 109. The application programs include a program 202 for realizing the torrential rain prediction function. The torrential rain prediction program 202 is an application for executing a core detection process included in the torrential rain prediction process, and a display process.

The bridge 102 is a bridge device which connects a local bus of the CPU 101, each device on a PCI (Peripheral Component Interconnect) bus, and each device on an LPC (Low Pin Count) bus. In addition, the bridge 102 incorporates an IDE (Integrated Drive Electronics) controller for controlling the SSD 109, etc. In addition, the bridge 102 includes a function of communicating with the sound controller 106. Alternatively, the bridge 102 includes a function of communicating with the GPU 105 via a PCI EXPRESS-standard serial bus, or the like.

The GPU 105 sends a video signal to the display 16a. The sound controller 106 is a sound source device, and outputs audio data, which is a playback target, to the speaker 18. The speaker 18 produces, for example, an alarm sound by a notification unit 39a which will be described later with reference to FIG. 3. A USB device or the like is connected to the USB connector 110. For example, the torrential rain prediction program 202 may be installed in the server (a torrential rain prediction apparatus) 10 via the USB device. The wireless LAN controller 112 is a wireless communication device which executes wireless communication of, for example, the IEEE 802.11 standard. The server 10 is connected to the network 14 by using, for example, the wireless LAN controller 112. The EC 113 is an embedded controller for power management. The EC 113 includes, for example, a function of powering on/off the server 10 in accordance with the user's operation.

The video memory (VRAM) 300 is connected to the GPU 105, and stores, for example, screen image data corresponding to a screen image which is displayed on the display 16a.

In the meantime, in the present embodiment, the client computer 15 displays the result of the torrential rain prediction process on the display 16, based on the display information 24. Here, the server 10 may display the result of the torrential rain prediction process on the display 16a, without intervention of the network 14.

[Operation of System]

Next, a description is given of a torrential rain prediction process as the weather prediction process in the system 1 of the present embodiment.

Here, a torrential rain occurs due to an abnormal weather phenomenon relating to a rain cloud such as a cumulonimbus. The abnormal weather phenomenon relating to the rain cloud is the occurrence of a cloud having a high density of raindrops, the cloud having a large moisture amount of raindrops or a large size of each raindrop. Incidentally, there is a case in which such a cloud having a high density of raindrops is a cloud other than the cumulonimbus.

FIG. 3 is a block diagram for describing a configuration example in which the server 10 realizes the torrential rain prediction function as a torrential rain prediction apparatus. As illustrated in FIG. 3, the server 10 includes a core detection unit 30, a core position information acquisition unit 32, a direction determination unit 34, an area calculation unit 36, a display information generation unit 38, and a presentation unit 39. These elements 30, 32, 34, 36, 38 and 39 are realized as functions of the torrential rain prediction program 202 which the processor 101 executes.

The core detection unit 30 executes a core detection process, based on the weather data 21, and sends a core detection result 211 to the core position information acquisition unit 32. The core detection process is, for example, a process of analyzing 3D data of a rain cloud, and determining whether there is a core having a predetermined size, etc., thereby detecting a core of the rain cloud. The server 10 stores the core information 22, which is calculated by the core detection process, in the core information storage 12. The core information 22 includes core detection data which is calculated by executing a well-known principal component analysis process relating to the core.

Figure 4:
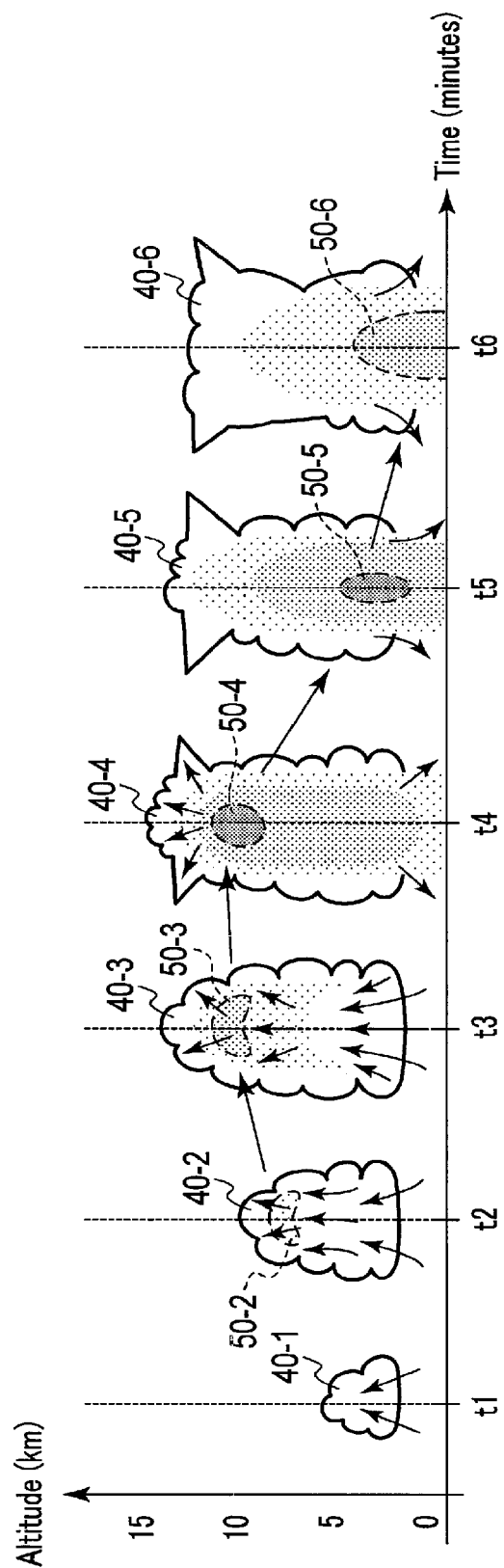
FIG. 4 is a view for describing an example of a generation process of a core relating to the embodiment.

FIG. 4 is a view for describing an example of a generation process of a core 50 in a rain cloud 40. The abscissa axis indicates time (minutes), and the ordinate axis indicates an altitude (km).

As illustrated in FIG. 4, for example, at time point t1, the core 50 has not yet occurred in a rain cloud 40-1. However, at time point t2, a core 50-2 occurs. Subsequently, at time points t2 to t4, the core 50 moves in a direction of increase in altitude (ascending direction), like the core 50-2 of a rain cloud 40-2, a core 50-3 of a rain cloud 40-3, and a core 50-4 of a rain cloud 40-4. Thereafter, at time points t4 to t6, the core 50 moves in a direction of decrease in altitude (descending direction), like the core 50-4 of the rain cloud 40-4, a core 50-5 of a rain cloud 40-5, and a core 50-6 of a rain cloud 40-6.

As described above, with the development of the rain cloud 40, the core 50 occurs, and the altitude of the core 50, that is, the position of the core 50, varies. In addition, as illustrated in FIG. 4, the size of the core 50 increases or decreases in various directions with the passing of time.

Referring back to FIG. 3, the core position information acquisition unit 32 acquires position information 212 of the core 50, based on the core detection result 211. Based on the core detection result 211, the core position information acquisition unit 32 calculates, as the position information 212 of the core 50, xyz coordinates in a three-dimensional (3D) space of the core 50. The core position information acquisition unit 32 sends to the direction determination unit 34 the position information 212 (current position information 212-1) of the core 50, and temporally immediately preceding position information (212-2) of the core 50, which is included in the core information 22 stored in the core information storage 12.

Here, for example, there is a case in which, before the core 50 is detected by the core detection unit 30, the position of the core 50 is predicted in advance based on the temporally immediately preceding position information of the core 50, which is stored in the core information storage 12. In such a case, the core position information acquisition unit 32 may calculate the position of the core 50, which was predicted in advance, as the position information 212. Thereby, the torrential rain prediction process can be executed at high speed.

The direction determination unit 34 determines the direction of movement of the core 50, based on the position information 212 of the core 50. Specifically, the direction determination unit 34 determines the movement direction of the core 50, by comparing the positions indicated by plural pieces of position information 212 acquired by the core position information acquisition unit 32. For example, the direction determination unit 34 calculates the movement direction of the core 50, by using a difference between a position vector indicated by the position information 212-1 of the core 50 and a position vector indicated by the position information 212-2 of the core 50. The direction determination unit 34 determines whether the calculated movement direction of the core 50 is a descending direction or not, or is an ascending direction or not. The direction determination unit 34 sends a determination result 213 of the movement direction of the core 50 to the area calculation unit 36.

FIG. 5 is a view illustrating an example of the movement direction of the core 50. Here, FIG. 5 illustrates an example of a three-dimensional (3D) display image 80 relating to the result of the torrential rain prediction process, which is displayed on the display 16 of the client computer 15. Incidentally, FIG. 5 illustrates an example of a temporal transition of the 3D display image 80 in an order of 3D display images 80a, 80b and 80c. In addition, FIG. 5 illustrates, for example, the state of a temporal transition of a core 50-1 in an order of cores 50a-1, 50b-1 and 50c-1.

As illustrated in FIG. 5, in the 3D display image 80a, a rain cloud 40a includes cores 50a-1 and 50a-2. Here, it is indicated that the core 50a-1 is moving in an ascending direction relative to a two-dimensional (2D) plane 60 which corresponds to the ground in the three-dimensional (3D) space. Specifically, it is indicated that a movement direction A of the core 50a-1 is the ascending direction. Incidentally, in FIG. 5, on the assumption that the cores 50a-2, 50b-2 and 50c-2 are substantially at rest, an arrow indicating the movement direction is not displayed.

For example, as illustrated in the 3D display image 80a, the core 50a-1 has a predetermined three-dimensional (3D) space region like an ellipsoid. The direction determination unit 34 calculates the movement direction A of the core 50a-1, based on a change of a predetermined position such as a center position of the core 50a-1, for example, a change from a position 81 to a position 82.

In the 3D display image 80b, a rain cloud 40b includes cores 50b-1 and 50b-2. Here, it is indicated that the core 50b-1 is moving in an ascending direction relative to the 2D plane 60. Specifically, it is indicated that a movement direction B of the core 50b-1 is an ascending direction. Incidentally, FIG. 5 illustrates a case in which the movement direction B has a smaller angle of the ascending direction relative to the ground, than the movement direction A.

In the 3D display image 80c, a rain cloud 40c includes cores 50c-1 and 50c-2. Here, it is indicated that the core 50c-1 is moving in a descending direction relative to the 2D plane 60. Specifically, it is indicated that a movement direction C of the core 50c-1 is a descending direction. In the 3D display image 80c, the movement direction C of the core 50c-1 is the descending direction. Thus, with respect to the core 50c-1, a planar area 70 in the 2D plane 60, which corresponding to the movement direction C, is displayed. This planar area 70 will be described later with reference to FIG. 6.

As described above, for example, the direction of movement of the core 50 (50-1) changes from the ascending direction to descending direction with the passing of time.

Referring back to FIG. 3, the area calculation unit 36 calculates the planar area 70, which corresponds to the movement direction (descending direction) of the core 50, as an area where the occurrence of a torrential rain is predicted, based on the determination result 213 of the movement direction of the core 50. Specifically, when the movement direction of the core 50 was determined to be the descending direction by the direction determination unit 34, the area calculation unit 36 calculates the planar area 70 which corresponds to this movement direction (direction C in FIG. 5) of the core 50.

The area calculation unit 36 sends a calculation result 214 relating to the planar area 70 to the display information generation unit 38. The calculation result 214 is, for example, xy coordinates relating to the planar area 70. In addition, the calculation result 214 may include information relating to the size of the core 50. In this case, the xy coordinates relating to the planar area 70 correspond to an equation of an ellipse which is formed by projecting the outer periphery of the core 50 in the movement direction of the core 50. In addition, the planar area 70 is, for example, an area where the vector indicative of the movement direction intersects with the 2D plane 60 in the 3D space (see FIG. 5).

Specifically, based on the determination result 213, the area calculation unit 36 calculates a time point, at which the core 50 begins to descend, as information relating to a predicted area. In addition, the area calculation unit 36 projects, in the 3D space, a predetermined 3D space region of the core 50 in the movement direction onto the 2D plane 60 which corresponds to the ground, and calculates the planar area 70, which is projected on the 2D plane 60, as a predicted area. Furthermore, the area calculation unit 36 calculates the size of the predicted area 70 in accordance with a temporally varying size of the predetermined 3D space region of the core 50.

Based on the calculation result 214, the display information generation unit 38 generates display information which is necessary for the display process. Specifically, the display information generation unit 38 generates, as information relating to the predicted area, display data 215 which is necessary for three-dimensionally or two-dimensionally displaying the predicted area 70. The display data is, for example, data relating to the 3D display image 80 or a two-dimensional (2D) display image 90 as shown in FIG. 6.

The display information generation unit 38 generates, as the display data 215, 3D or 2D image data of each of the rain cloud 40, 2D plane 60, core 50 and planar area 70, which are prestored in the core information storage 12. In a concrete example, the 3D display image 80 or 2D display image 90 is generated by disposing the 3D or 2D image data at the xyz coordinates or xy coordinates indicated by the calculation result 214 of the area calculation unit 36. Here, the 3D display image 80 is generated by using, for example, volume rendering.

Figure 6:
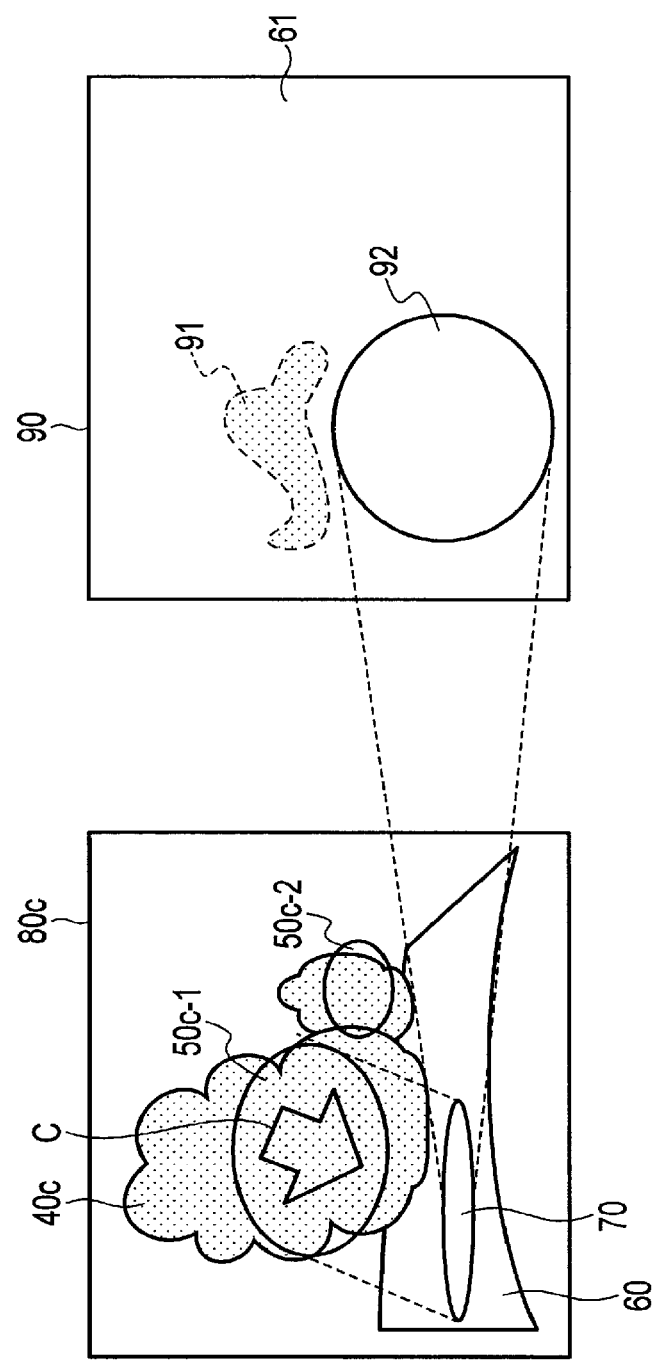
FIG. 6 is a view for describing an example of a display image of a torrential rain prediction area in the torrential rain prediction process of the embodiment.

FIG. 6 is a view illustrating an example of the display image of the planar area 70 which is the torrential rain prediction area. FIG. 6 illustrates the 3D display image 80c shown in FIG. 5, and the 2D display image 90 corresponding to the 3D display image 80c.

Referring back to FIG. 3, the area calculation unit 36 projects, for example, in the imaginary 3D space such as the 3D display image 80c, the 3D space region of the ellipsoidal core 50 in the movement direction C onto the 2D plane 60. Then, the area calculation unit 36 calculates, as the torrential rain prediction area, the planar area 70 which is projected on the 2D plane 60. Based on the calculation result 214, the display information generation unit 38 generates the 3D display image 80 (80c) including the planar area 70, or the 2D display image 90 including an area 92 corresponding toe the planar area 70 (see FIG. 6).

Here, the 2D display image 90 illustrated in a right part of FIG. 6 is a view in a case in which the 3D display image 80c is viewed from above relative to the 2D plane 60. In the 2D display image 90 of FIG. 6, the area 92 corresponding to the planar area 70 and an area 91 corresponding to the position of the rain cloud 40c are shown on the ground 61 corresponding to the 2D plane 60. In this manner, when viewed from above, there is a case in which the area where a torrential rain is predicted, that is, the area 92, differs from the position of the rain cloud 40c, that is, the area 91.

Referring back to FIG. 3, the presentation unit 39 includes a notification unit 39a and a display unit 39b. The presentation unit 39 presents, based on the display data 215, information relating to the torrential rain prediction area, for example, the display information 24 relating to the planar area 70.

Here, the notification unit 39a notifies the display information 24 to a user in an area corresponding to the planar area 70 included in the display data 215. For example, the notification unit 39a notifies, by e-mail, the user that a torrential rain is occurring. In addition, for example, by using a speaker of the client computer 15, the notification unit 39a may issue a notification, as an alarm sound, to the user, who has a relation to the planar area 70, to the effect that the torrential rain is occurring. Besides, by causing the display 16 to display that the torrential rain is occurring, this fact can be notified. In the meantime, that the torrential rain is occurring means, for example, that the user is present in an area near the area where the torrential rain is predicted, and the notification may be given by stepwise changing the alert level, with the area where the torrential rain is predicted being set as the center. The display unit 39b executes a process of causing the display 16 of the client computer 15, which the user utilizes, to display the display information 24.

FIG. 7 is a view illustrating an example of the core information 22. As illustrated in FIG. 7, the core information 22 is stored in the core information storage 12 as a structure of a database 500 including a core number information item 500a, a core position information item 500b and a core size information item 500c.

The core number information item 500a indicates information for identifying the core 50. For example, this information relates to three-dimensional data of the rain cloud 40 included in the weather data 21, and is temporally sequential frames. Here, for example, when an Nth frame (frame N) of the sequential frames corresponds to a core number "#2", the immediately preceding frame N−1 corresponds to a core number "#1". In addition, the immediately subsequent frame N+1 corresponds to a core number "#3". Incidentally, each frame N corresponds to, for example, data obtained by a single scan of the weather radar 8.

The core position information item 500b indicates information relating to the position of the core 50, for example, xyz coordinates of the core 50. For example, the position of the core 50 corresponding to the core number "#2" is (x, y, z)=(−100, +80, +50). The core size information item 500c indicates information relating to the size of the core 50. For example, the size of the core 50 corresponding to the core number "#2" is (major axis, minor axis)=(80, 10).

In addition, the core number information item 500a, core position information item 500b and core size information item 500c are in a one-to-one correspondence. For example, with an increase of the number of the core 50, that is, with the passing of time, the z coordinate corresponding to the altitude of the core 50 increases and then decreases. In addition, FIG. 7 shows that the size of the core increases as the number of the core 50 becomes larger.

Next, referring to a flowchart of FIG. 8, a description will be given of an example of the procedure of the torrential rain prediction process which is executed by the server 10.

Figure 8:
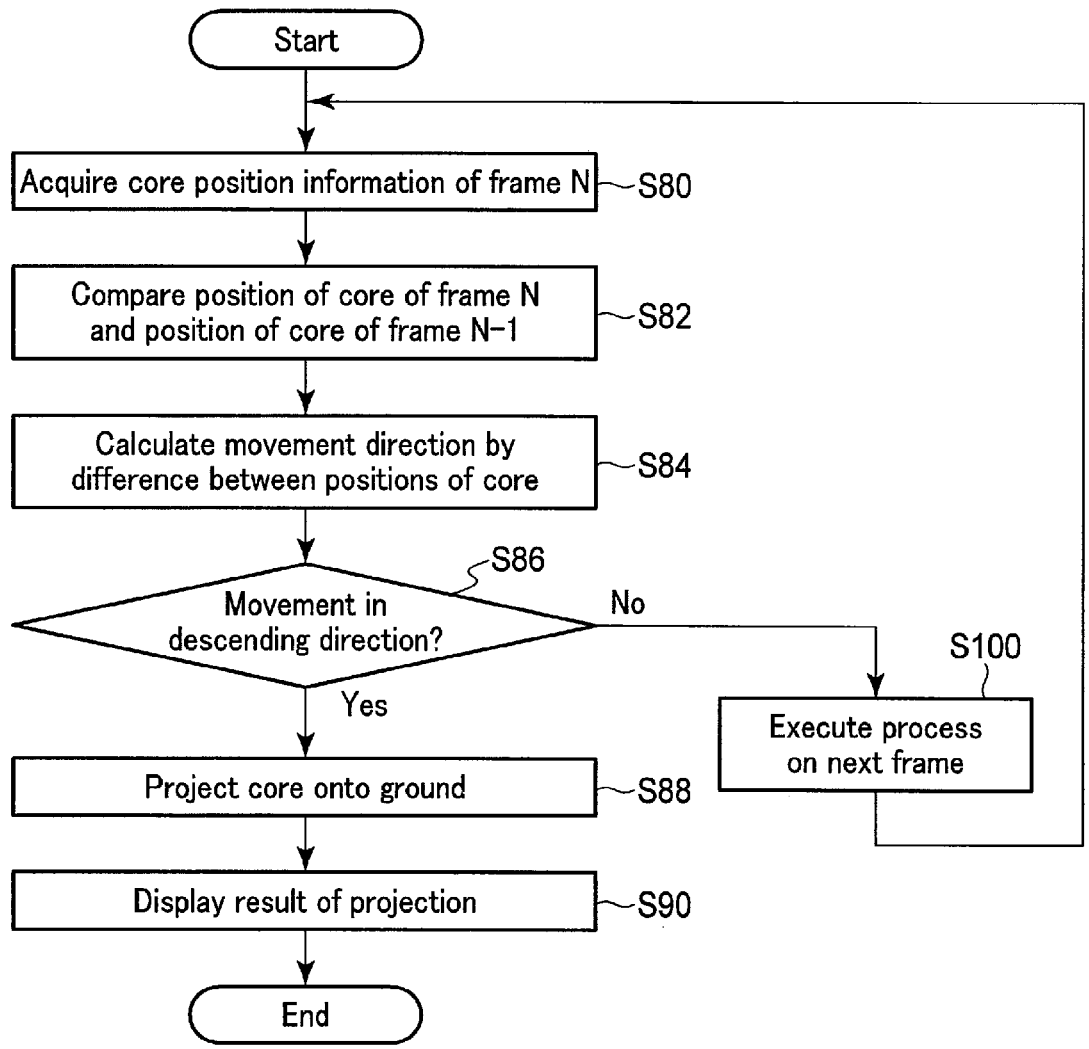
FIG. 8 is a flowchart illustrating an example of the procedure of the torrential rain process of the embodiment.

As illustrated in FIG. 8, the server 10 first acquires the weather data 21 from the weather data storage 9 (step S80). The server 10 acquires, for example, position information of the core 50 relating to the frame N. The frame N corresponds to, for example, the weather data 20 obtained by a single scan of the weather radar 8.

Next, the server 10 compares the position of the core 50 indicated by the position information of the core 50 relating to the frame N, which was obtained by the process of step S80, and the position of the core 50 indicated by the position information of the core 50 relating to the frame N−1, which was already obtained (step S82). The server 10 calculates a difference between the positions of the core 50, based on the comparison result by the process of step S82, and calculates the movement direction of the core 50 from this difference (step S84). In the meantime, instead of comparing the positions of the respective frames N, for example, the movement direction of the core 50 may be calculated based on a variation of the frame N relative to a predetermined position in the 3D space.

Next, the server 10 determines whether the movement direction of the core 50 calculated by the process of step S84 is a descending direction or not (step S86). Specifically, the server 10 determines whether the core 50 has moved downward relative to the ground. If the server 10 determines that the movement direction of the core 50 is not the descending direction (No in step S86), the server 10 starts the process relating to the next frame N+1 (step S100).

On the other hand, if the server 10 determines that the movement direction of the core 50 is the descending direction (Yes in step S86), the server 10 projects the core 50 in a direction toward the ground (step S88). The server 10 executes a display process such that the planar area 70 corresponding to the projected core 50 can be displayed on the display 16 of the client computer 15 as the result of the projection by the process of step S88 (step S90). Specifically, as described above, the server 10 transmits to the client computer 15 the display information 24 for executing this display process.

As has been described above, according to the present embodiment, the server 10 detects the core of the rain cloud by utilizing the weather data observed by the weather radar 8, and acquires the position information of the core, based on the detection result of the core. Further, the server 10 determines, based on the position information of the core, whether the movement direction of the core is the descending direction relative to the ground. When the determination result indicates the descending direction, the server 10 calculates the area corresponding to the ground, onto which the core is projected, as the area where the occurrence of the torrential rain is predicted. Accordingly, the server 10 can predict the occurrence of the torrential rain, and can predict the area where the torrential rain occurs.

Thereby, the client computer 15, which the user operates, can display, on the display 16, the core and the area where the torrential rain is predicted, by receiving the display information 24 relating to the torrential rain prediction process from the server 10. Accordingly, since the user can know, in real time, the occurrence of the torrential rain, it is possible to support, for example, the user's judgment in disaster prevention, etc. In a concrete example, a user, who is the manager of a river, can adjust in advance the pump of the pump facility, based on the prediction of the occurrence of a torrential rain.

In addition, the capability of the PAWR, by which the 3D structure of a rain cloud, which develops in a short time of about 30 minutes, can be grasped within a short time of about 30 seconds, can be utilized to the maximum, and the area where a torrential rain or the like occurs can efficiently be visualized in real time. In this case, the shape of the entirety of the rain cloud can be three-dimensionally displayed on the display 16 of the client computer 15, and can thereby be visualized. Moreover, for example, the position of the core and the size of the core are displayed at the same time, and thereby the user can easily understand the position of the core and the size of the core.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A weather prediction apparatus comprising:
    a storage configured to store weather data of a rain cloud observed by a weather radar; and
    a processor configured to predict a torrential rain, the processor being configured to:
    detect a core including a three-dimensional space region of the rain cloud, based on the weather data;
    acquire position information of the core, based on a detection result of the core;
    determine a movement direction of the core, based on the position information; and
    calculate, as an area of occurrence of the torrential rain, a planar area projected onto a two-dimensional plane by projecting the three-dimensional space region included in the core in the movement direction of the core onto the two-dimensional plane which corresponds to the ground.

2. The weather prediction apparatus of claim 1, wherein the processor is configured to:
    determine, based on the position formation, whether the movement direction of the core is a descending direction; and
    calculate information for predicting, when the movement direction of the core is the descending direction.

3. The weather prediction apparatus of claim 2, wherein the processor is configured to:
    calculate a time point at which the core begins to descend, when the movement direction of the core is the descending direction; and
    calculate information for predicting, which includes information indicative of the time point at which the core begins to descend.

4. The weather prediction apparatus of claim 1, wherein the processor is configured to:
    calculate a size of the area of occurrence of the torrential rain, in accordance with a temporally varying size of the three-dimensional space region; and
    calculate information for predicting, which includes information indicative of the size of the area of occurrence of the torrential rain.

5. The weather prediction apparatus of claim 1, wherein the processor is configured to:
    generate, as information for predicting, display information which is necessary for three-dimensionally displaying or two-dimensionally displaying the area of occurrence of the torrential rain.

6. The weather prediction apparatus of claim 1, wherein the processor is configured to:
    transmit information for predicting to a client computer, such that the information for the predicting is capable of being notified or displayed.

7. A system comprising:
    a weather radar;
    the weather prediction apparatus of claim 1; and
    a computer configured to be connected to the weather prediction apparatus via a network, and configured to display information which is transmitted from the weather prediction apparatus,
    the processor being configured to:
    generate display information for displaying information for predicting, and transmit the display information to the computer.

8. The system of claim 7, wherein the weather radar comprises a phased array weather radar.

9. A method of predicting weather in a weather prediction apparatus which uses weather data observed by a weather radar, the method comprising;
    detecting a core including a three-dimensional space region of a rain cloud, based on the weather data;
    acquiring position information of the core, based on a detection result of the core;
    determining a movement direction of the core, based on the position information; and calculating, as an area of occurrence of a torrential rain, a planar area projected onto a two-dimensional plane by projecting the three-dimensional space region included in the core in the movement direction of the core onto the two-dimensional plane which corresponds to the ground.

10. The method of claim 9, further comprising:

determining, based on the position information, whether the movement direction of the core is a descending direction; and calculating information for predicting, when the movement direction of the core is the descending direction.

11. A non-transitory computer-readable storage medium storing a computer program performed by a computer, the computer program comprising:

an instruction of detecting a core including a three-dimensional space region of a rain cloud, based on weather data;

an instruction of acquiring position information of the core, based on a detection result of the core;

an instruction of determining a movement direction of the core, based on the position information; and an instruction of calculating, as an area of occurrence of a torrential rain, a planar area projected onto a two-dimensional plane by projecting the three-dimensional space region included in the core in the movement direction of the core onto the two-dimensional plane which corresponds to the ground.

12. The non-transitory computer-readable storage medium of claim 11, the computer program further comprising:

an instruction of determining, based on the position information, whether the movement direction of the core is a descending direction; and an instruction of calculating information for predicting, when the movement direction of the core is the descending direction.

* * * * *